(12) United States Patent
Miyazaki

(10) Patent No.: US 10,409,147 B2
(45) Date of Patent: Sep. 10, 2019

(54) LIGHT SOURCE DEVICE WITH DICHROIC MIRROR HAVING AREAS OF DIFFERENT CHARACTERISTICS, AND PROJECTOR INCLUDING THE LIGHT SOURCE DEVICE

(71) Applicant: CASIO COMPUTER CO., LTD., Shibuya-ku, Tokyo (JP)

(72) Inventor: Takeshi Miyazaki, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/016,957

(22) Filed: Jun. 25, 2018

(65) Prior Publication Data

US 2018/0373133 A1    Dec. 27, 2018

(30) Foreign Application Priority Data

Jun. 27, 2017  (JP) .................................. 2017-124751

(51) Int. Cl.
  *G03B 21/20*    (2006.01)
  *G02B 26/00*    (2006.01)

(52) U.S. Cl.
  CPC ......... *G03B 21/204* (2013.01); *G02B 26/008* (2013.01); *G03B 21/2013* (2013.01); *G03B 21/2066* (2013.01)

(58) Field of Classification Search
  CPC .............. G03B 21/204; G03B 21/2013; G03B 21/2066; G02B 26/008
  See application file for complete search history.

(56) References Cited

U.S. PATENT DOCUMENTS

| | | |
|---|---|---|
| 8,342,697 B2 | 1/2013 | Iwanaga |
| 8,434,875 B2 | 5/2013 | Masuda |
| 8,746,896 B2 | 6/2014 | Ogura et al. |
| 8,757,814 B2 | 6/2014 | Masuda |
| 9,207,522 B2 | 12/2015 | Masuda et al. |
| 9,769,436 B2 | 9/2017 | Fukano |
| 9,817,304 B2 | 11/2017 | Ogino |

(Continued)

FOREIGN PATENT DOCUMENTS

JP    2017009684 A    1/2017

OTHER PUBLICATIONS

Extended European Search Report (EESR) dated Aug. 10, 2018 issued in European Application No. 18179871.1.

*Primary Examiner* — Sultan Chowdhury
*Assistant Examiner* — Magda Cruz
(74) *Attorney, Agent, or Firm* — Holtz, Holtz & Volek PC

(57) ABSTRACT

A light source device includes a first light source, a second light source and a composite dichroic mirror. The first light source is configured to emit light of a first wavelength band. The second light source is configured to emit light of a second wavelength band which is different from the first wavelength band. The composite dichroic mirror has a first area and a second area which characteristics is different from characteristics of the first area. The composite dichroic mirror reflects the light of the first wavelength band while transmitting the light of the second wavelength band. The light of the first wavelength band is radiated corresponding to the first area and the second area of the composite dichroic mirror, and the light of the second wavelength band is radiated corresponding to the first area of the composite dichroic mirror.

18 Claims, 8 Drawing Sheets

(56) References Cited

U.S. PATENT DOCUMENTS

| | | |
|---|---|---|
| 2010/0328628 A1 | 12/2010 | Masuda |
| 2011/0063581 A1 | 3/2011 | Iwanaga |
| 2012/0075591 A1 | 3/2012 | Ogura et al. |
| 2013/0293850 A1 | 11/2013 | Masuda |
| 2014/0078472 A1 | 3/2014 | Masuda et al. |
| 2014/0232996 A1* | 8/2014 | Okamoto ............... G02B 27/48 353/85 |
| 2015/0261077 A1 | 9/2015 | Ogino |
| 2015/0316775 A1* | 11/2015 | Hsieh ................. G03B 21/2013 353/31 |
| 2016/0182869 A1 | 6/2016 | Fukano |
| 2016/0223890 A1* | 8/2016 | Okuda ............... G03B 21/2013 |

* cited by examiner

LIGHT SOURCE DEVICE WITH DICHROIC MIRROR HAVING AREAS OF DIFFERENT CHARACTERISTICS, AND PROJECTOR INCLUDING THE LIGHT SOURCE DEVICE

CROSS-REFERENCE TO RELATED APPLICATION

This application is based upon and claims the benefit of priority from Japanese Patent Application No. 2017-124751, filed on Jun. 27, 2017, the entire contents of which are incorporated herein by reference.

BACKGROUND OF THE INVENTION

Field of the Invention

The present invention relates to a light source device and a projector having the light source device.

Description of the Related Art

Recently, data projectors are often used as imaging apparatuses for projecting screens of personal computers, video screens, images based on image data stored in memory cards and the like, and so on onto screens. Such projectors are for concentrating light emitted from light sources on a micromirror display element called DMD (Digital Micromirror Device) or a liquid crystal panel and displaying color images on a screen.

In the related art, in such projectors, projectors using high-luminance discharge lamps as light sources predominated; however, recently, various projectors using other light sources such as light emitting diodes, laser diodes, organic EL, or phosphors have been developed.

JP-A-2017-9684 discloses a projector, which includes a red light source device, and an optical wheel device having a fluorescent area which emits fluorescent light of a green wavelength band if being irradiated with light of a blue wavelength band emitted as excitation light from an excitation light radiation device and a diffuse transmission area which transmits while diffusing the light emitted from the excitation light radiation device. Since light emitted from the excitation light radiation device passes through the diffuse transmission area of the optical wheel while diffusing, the excitation light radiation device is also regarded as a blue light source. Further, at a position where the light of the blue wavelength band and the light of the green wavelength band intersect with light of a red wavelength band, a dichroic mirror which transmits light of the blue wavelength band and light of the red wavelength band and reflects light of the green wavelength band is disposed.

Sometimes, in light of the red wavelength band and light of the green wavelength band, the short wavelength side of the light of the red wavelength band and the long wavelength side of the light of the green wavelength band overlap in a wavelength band. Further, sometimes, of light of the red wavelength band incident on the dichroic mirror, red light of wavelengths in a range overlapping light of the green wavelength band is reflected by the dichroic mirror. The light of the red wavelength band reflected by the dichroic mirror is discarded without being used as irradiation light. As described above, in optical systems using dichroic mirrors, sometimes, luminous efficiency of light decreases.

An object of the present invention is to provide a light source device capable of improving the light use efficiency of source light, and a projector including the light source device.

SUMMARY OF THE INVENTION

According to one aspect of the present invention, a light source device includes a first light source, a second light source and a composite dichroic mirror. The first light source is configured to emit light of a first wavelength band. The second light source is configured to emit light of a second wavelength band which is different from the first wavelength band. The composite dichroic mirror has a first area and a second area which characteristics is different from characteristics of the first area. The composite dichroic mirror reflects the light of the first wavelength band while transmitting the light of the second wavelength band. The light of the first wavelength band is radiated corresponding to the first area and the second area of the composite dichroic mirror, and the light of the second wavelength band is radiated corresponding to the first area of the composite dichroic mirror.

According to another aspect of the present invention, a light source device includes a first light source, a second light source and a composite dichroic mirror. The first light source is configured to emit light of a first wavelength band. The second light source is configured to emit light of a second wavelength band which is adjacent to the first wavelength band. The composite dichroic mirror has a first area and a second area which characteristics is different from characteristics of the first area. The composite dichroic mirror transmits the light of the first wavelength band while reflecting the light of the second wavelength band. The light of the first wavelength band is radiated corresponding to the first area and the second area of the composite dichroic mirror, and the light of the second wavelength band is radiated corresponding to the first area of the composite dichroic mirror.

DETAILED DESCRIPTION OF THE PREFERRED EMBODIMENT

Figure 1:
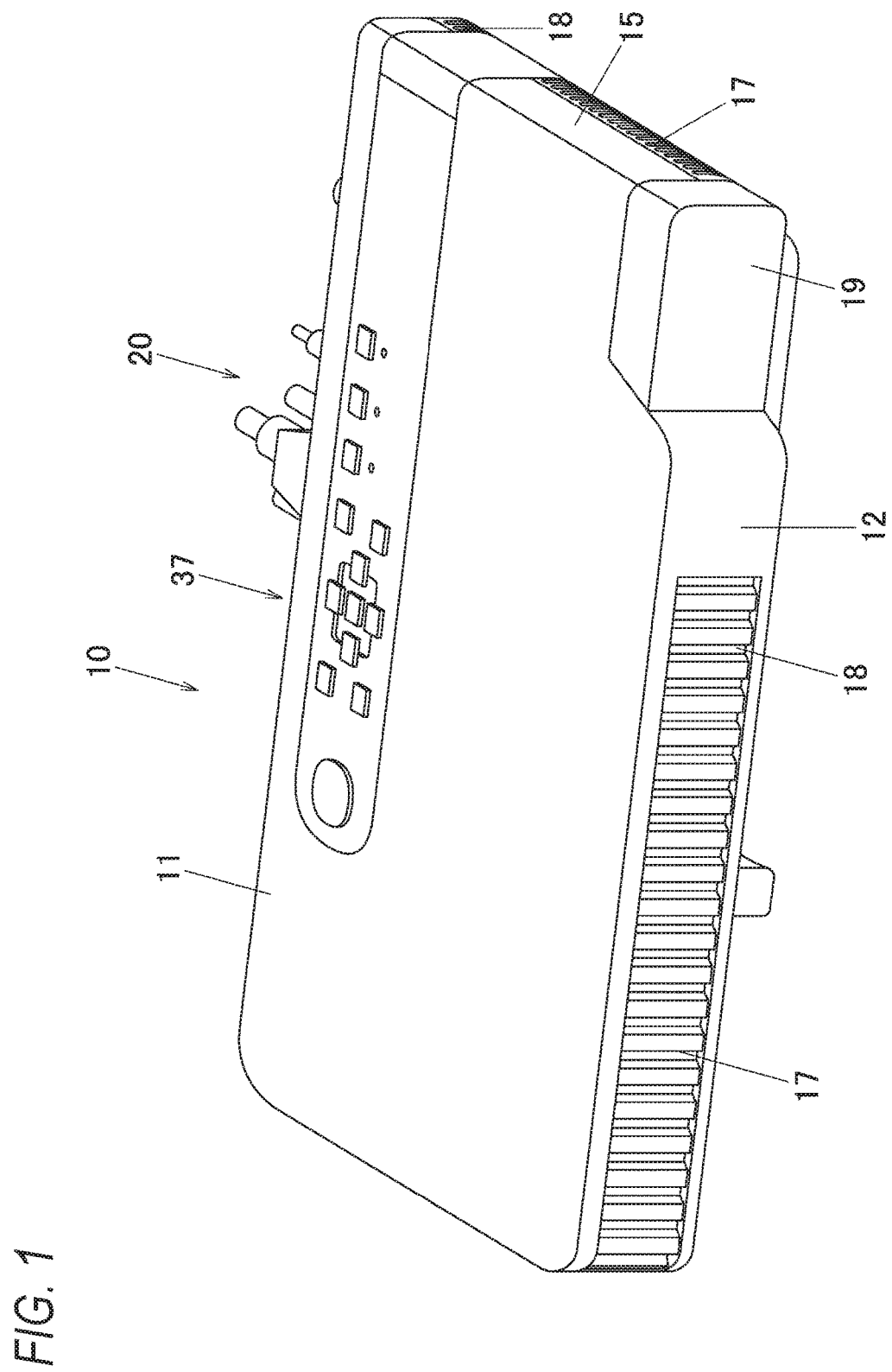
FIG. 1 is a perspective view illustrating the external appearance of a projector according to a first embodiment of the present invention.

Hereinafter, an embodiment of the present invention will be described. FIG. 1 is a perspective view illustrating the external appearance of a projector 10 according to the present invention embodiment. Also, in the present embodiment, the left and right of the projector 10 represent left and right with respect to a projection direction, and the front and rear of the projector represent the front and rear of the projector 10 in the direction toward a screen and the traveling direction of a flux of light.

As shown in FIG. 1, the projector 10 has the approximate shape of a cube, and has a lens cover 19 provided on one side of a front panel 12 which is a side panel of the front side of a casing so as to cover a projection port, and the front panel 12 has a plurality of air intake holes 18 and a plurality of air exhaust holes 17. Further, although not shown in FIG. 1, the projector has an IR receiver for receiving control signals from a remote controller.

Also, a top panel 11 of the casing has a key/indicator unit 37, and the key/indicator unit 37 includes various keys and indicators such as a power switch, a power indicator for informing whether the power is on or off, a projection switch for switching projection on or off, and an overheat indicator for informing if a light source unit, a display element, a control circuit, or the like is overheated.

Further, a rear panel of the casing has an input/output connector part having a USB terminal, a D-SUB terminal for inputting image signals, an S terminal, RCA terminals, and so on, and various terminals 20 such as a power supply adapter plug. Also, the rear panel has a plurality of air intake holes. Also, a right panel (not shown in FIG. 1) of the casing which is a side panel, and a left panel 15 which is another side panel and is shown in FIG. 1 each have a plurality of air exhaust holes 17. Also, a corner of the left panel 15 around the rear panel has air intake holes 18.

Figure 2:
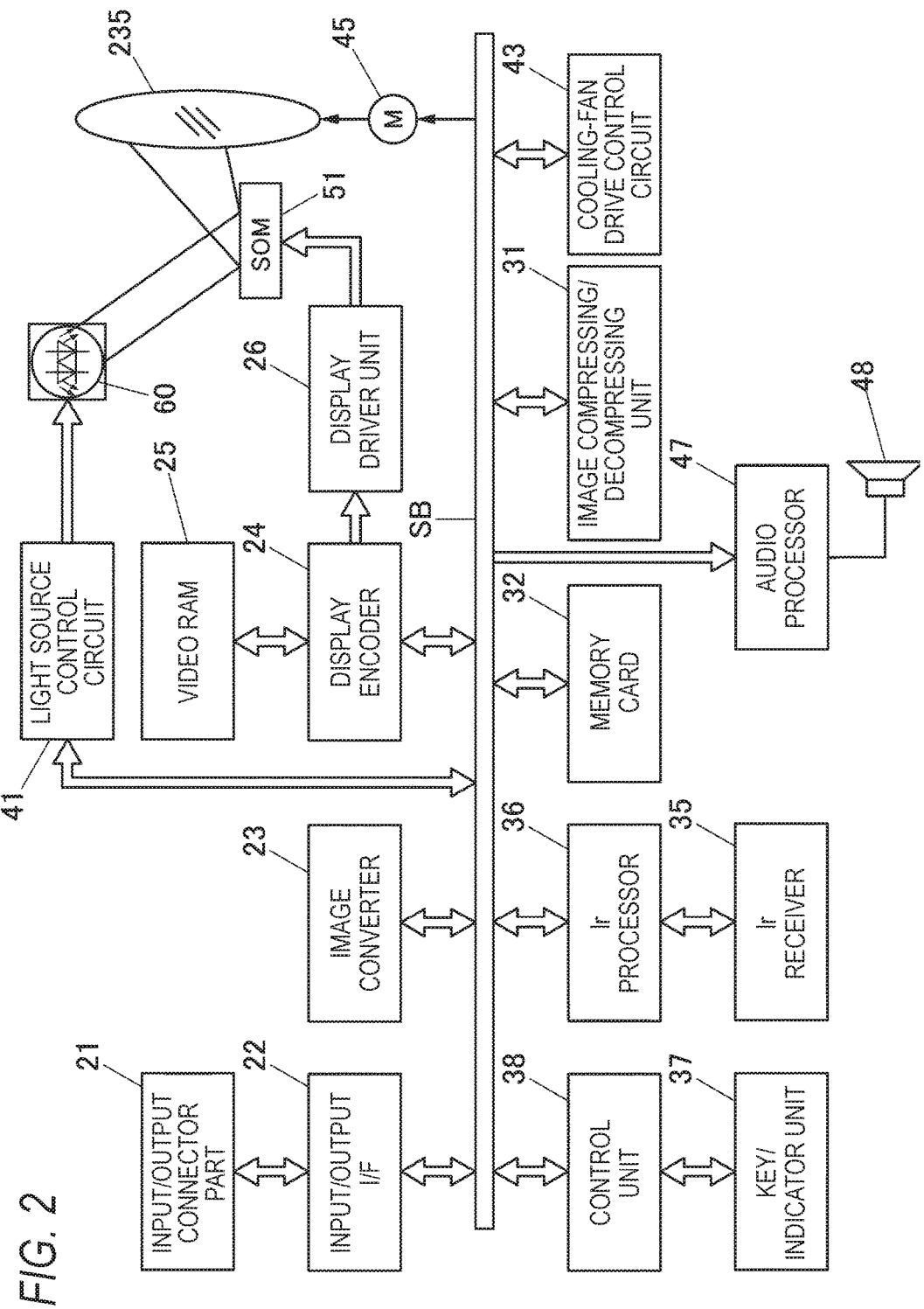
FIG. 2 is a view illustrating functional circuit blocks of the projector according to the first embodiment of the present invention.

Now, a projector control unit of the projector 10 will be described with reference to the functional circuit block diagram of FIG. 2. The projector control unit includes a control unit 38, an input/output interface 22, an image converter 23, a display encoder 24, a display driver unit 26, and so on. Image signals of various standards input from an input/output connector part 21 are transmitted via the input/output interface 22 and a system bus (SB), and are converted into image signals of a predetermined format suitable for display by the image converter 23, and are output to the display encoder 24.

After the input image signals are decompressed and are stored in a video RAM 25, the display encoder 24 generates video signals from the contents stored in the video RAM 25, and outputs the video signals to the display driver unit 26.

The display driver unit 26 serves as a display element control means. The display driver unit 26 drives a display element 51 which is a spatial optical modulator (SOM) at an appropriate frame rate corresponding to each image signal output from the display encoder 24. Then, the projector 10 guides a flux of light emitted from a light source device 60 onto the display element 51 via an optical guiding system, thereby forming optical images by the reflected light from the display element 51, and projects the images onto a screen (not shown in the drawings) through a projection side optical system to be described below. Also, the projection side optical system includes a movable lens group 235, which is driven for zoom adjustment and focus adjustment by a lens motor 45.

An image compressing/decompressing unit 31 performs data compression on luminance signals and color difference signals of image signals by processing such as ADCT and Huffman encoding, and performs a recording process of sequentially writing the compressed data in a memory card 32 which is a portable recording medium. Further, in a reproduction mode, the image compressing/decompressing unit 31 reads out the image data stored in the memory card 32, and decompresses image data constituting a video in units of one frame. The image compressing/decompressing unit 31 outputs the decompressed image data to the display encoder 24 via the image converter 23, thereby making it possible to display the video and the like on the basis of the image data stored in the memory card 32.

The control unit 38 is for controlling the operations of individual circuits included in the projector 10, and is configured with a CPU, a ROM retaining operation programs such as various settings, a RAM usable as a work memory, and so on.

Operation signals of the key/indicator unit 37 installed on the top panel 11 of the casing and configured with main keys, indicators, and so on are transmitted directly to the control unit 38, and key operation signals from the remote controller are received by an IR receiver 35, and are demodulated into code signals by an IR processor 36, and the code signals are output to the control unit 38.

The control unit 38 is connected to an audio processor 47 via the system bus (SB). The audio processor 47 includes a sound source circuit such as a PCM sound source. In a projection mode and the reproduction mode, the audio processor converts audio data into analog data, and drives a speaker 48 such that the speaker outputs the sound at a volume.

Also, the control unit 38 controls a light source control circuit 41 which is a light source control means. The light source control circuit 41 controls an excitation light source and a red light source device such that they emit light of a red wavelength band, a green wavelength band, and a blue wavelength band at predetermined timings, whereby light of predetermined wavelength bands required for image generation is emitted from the light source device 60, and also performs control on each of a color wheel device 190 and so on to be described below.

Further, the control unit 38 controls a cooling-fan drive control circuit 43 such that the cooling-fan drive control circuit performs temperature detection using a plurality of temperature sensors installed on the light source device 60 and so on and controls the rotation speed of cooling fans according to the result of the temperature detection. Also, the control unit 38 controls the cooling-fan drive control circuit 43 such that the cooling-fan drive control circuit keeps rotating the cooling fans by a timer or the like even after the power of the main body of the projector 10 is turned off, or performs control to turn off the power of the main body of the projector 10, or the like, depending on the result of temperature detection.

Figure 3:
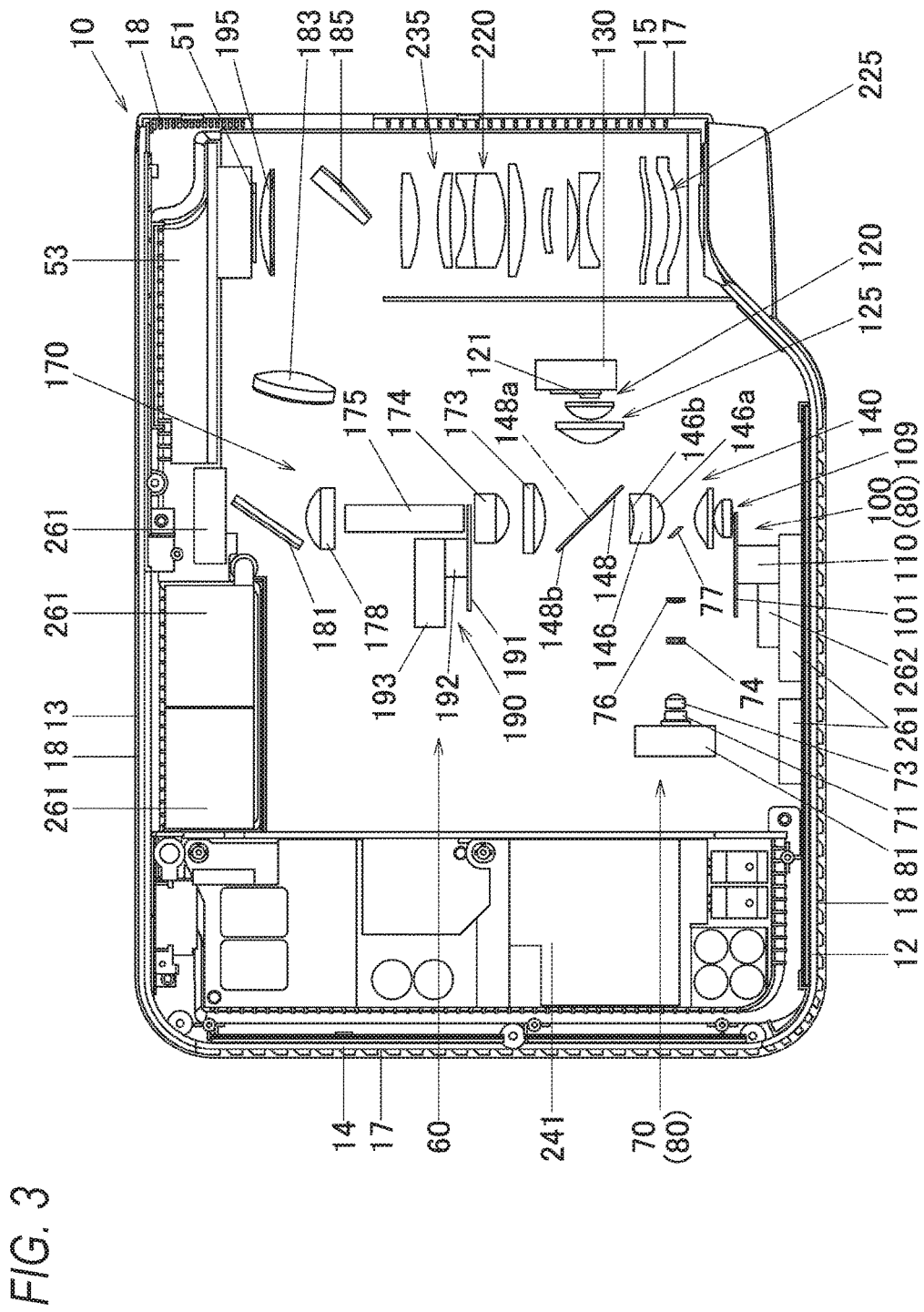
FIG. 3 is a plan view schematically illustrating the inner structure of the projector according to the first embodiment of the present invention.

FIG. 3 is a plan view schematically illustrating the inner structure of the projector 10. The projector 10 has a control circuit board 241 in the vicinity of a right panel 14. The control circuit board 241 has a power supply circuit block, a light source control block, and so on. Also, the projector 10 has the light source device 60 on a side of the control circuit board 241, i.e. in an approximate center part of the casing of the projector 10. Further, the projector 10 has a light source side optical system 170 and a projection side optical system 220 between the light source device 60 and the left panel 15.

The light source device 60 includes a red light source device 120 which is a light source (a first light source) of light of a red wavelength band (light of a first wavelength band), a green light source device 80 which is a light source (a second light source) of light of a green wavelength band (light of a second wavelength band), and an excitation light radiation device 70 which is a blue light source device (a third light source) of light of a blue wavelength band (light of a third wavelength band) and is an excitation light source. The green light source device 80 is configured with the excitation light radiation device 70 and a fluorescent wheel device 100. Also, the light source device 60 has an optical guiding system 140 for guiding light of the wavelength bands of the individual colors and emitting the light. The optical guiding system 140 guides light of the wavelengths of the individual colors emitted from the light source devices 70, 80, and 120 to the light source side optical system 170.

The excitation light radiation device 70 is disposed in the vicinity of the front panel 12 close to the right panel 14 in the left-right direction of the casing of the projector 10. Further, the excitation light radiation device 70 includes blue laser diodes 71 which are semiconductor light emitting devices disposed such that their optical axes are parallel with the front panel 12. On the optical axes of the blue laser diodes 71, a collimator lens 73 for converting light emitted from the blue laser diodes 71 into parallel light in order to improve the directivity of the light, a microlens array 74 for uniformizing the intensity distribution of the light of the blue laser diodes 71 emitted via the collimator lens 73, and an adjustment lens 76 for adjusting the section shape of the flux of light emitted from the microlens array 74 are disposed. By the microlens array 74 and the adjustment lens 76, the irradiation density of the excitation light on a fluorescent area 103 of a fluorescent wheel 101 of the fluorescent wheel device 100 to be described below is relaxed and luminance efficiency is improved.

On a side of the adjustment lens 76 close to the left panel 15, on the emission side of the fluorescent wheel device 100, a dichroic mirror 77 is disposed. The dichroic mirror 77 reflects light of the blue wavelength band and transmits light of the green wavelength band. The dichroic mirror 77 changes the optical axis of the light of the blue wavelength band of the excitation light radiation device 70 emitted via the microlens array 74 and the adjustment lens 76 toward the fluorescent wheel 101 by 90°. This dichroic mirror 77 will be described below in detail. Also, on the rear surface side of the blue laser diode 71, a heat sink 81 is disposed, and in the vicinities of the front panel 12 and a rear panel 13, cooling fans 261 are disposed. The blue laser diode 71 is cooled by the heat sink 81 and the cooling fans 261.

The red light source device 120 includes a red light source 121 disposed such that the optical axis is parallel with the blue laser diode 71, and a condensing lens group 125 for collecting light emitted from the red light source 121. The red light source 121 is a red light emitting diode which is a semiconductor light emitting device configured to emit light of the red wavelength band. Further, the red light source device 120 is disposed such that the optical axis of light of the red wavelength band emitted from the red light source device 120 intersects with the optical axis of light of the green wavelength band emitted from the fluorescent wheel 101 to be described below. Furthermore, the red light source device 120 is cooled by a heat sink 130 disposed on a side of the red light source 121 close to the left panel 15.

The fluorescent wheel device 100 includes the fluorescent wheel 101 disposed so as to be parallel with the front panel 12 such that light emitted from the fluorescent wheel crosses light emitted from the excitation light radiation device 70 and the red light source device 120 at right angles, a wheel motor 110 configured to rotate the fluorescent wheel 101, and a condensing lens group 109 which is an optical component for collecting the flux of light emitted from the fluorescent wheel 101 toward the rear panel 13 while collecting the flux of excitation light emitted from the excitation light radiation device 70. Also, between the wheel motor 110 and the front panel 12, a heat sink 262 is disposed, and this heat sink 262 cools the fluorescent wheel device 100 and so on.

Figure 4A:
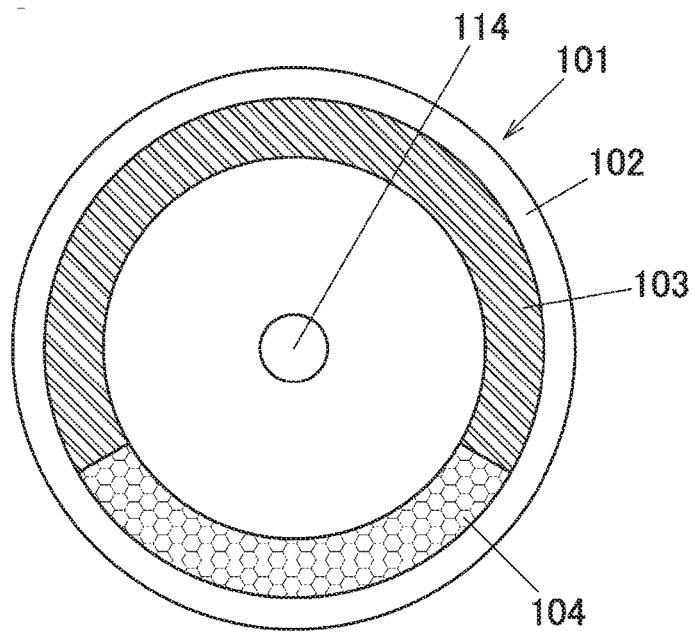
FIG. 4A is a front view schematically illustrating a fluorescent wheel of a light source device according to the first embodiment of the present invention.

The fluorescent wheel 101 is formed in a disk shape as shown in FIG. 4A. Further, the fluorescent wheel 101 includes a base member 102 which is a metal base member made of a metal such as copper or aluminum. The base member 102 is fixed to a motor shaft 114 of the wheel motor 110. The base member 102 has a flat front surface on which mirror finishing is performed by silver deposition or the like. The fluorescent area 103 is formed by forming an annular green phosphor layer on the front surface and performing mirror finishing thereon. Also, a diffuse reflection area 104 which is a reflective mirror is formed by forming fine irregularities on the surfaces of cutout through-holes of the base member 102 by sand blasting or the like and fitting diffuse reflection members such as glass members having reflective coats thereon in the cutout through-holes. In this way, the fluorescent area 103 and the diffuse reflection area 104 are formed in the circumferential direction together.

If the phosphor layer of the fluorescent area 103 is irradiated with light of the blue wavelength band which is excitation light from the excitation light radiation device 70, the green phosphor is excited, and light of the green wavelength band is radiated from the green phosphor to all directions. The flux of light emitted by fluorescence is emitted toward the front surface of the fluorescent wheel 101 shown in FIG. 3 (in other words, toward the rear panel 13), and enters the condensing lens group 109. Meanwhile, the light of the blue wavelength band of the excitation light radiation device 70 entering the diffuse reflection area 104 of the fluorescent wheel 101 is reflected from the front surface side of the fluorescent wheel 101, and enters the condensing lens group 109.

The optical guiding system 140 for guiding light such that the optical axes of the light of the red, green, and blue wavelength bands become the same optical axis includes a condensing lens 146 and a composite dichroic mirror 148. The condensing lens 146 is disposed on a side of the dichroic mirror 77 close to the rear panel 13. The composite dichroic mirror 148 is disposed on a side of the condensing lens 146 close to the rear panel 13.

Figure 5:
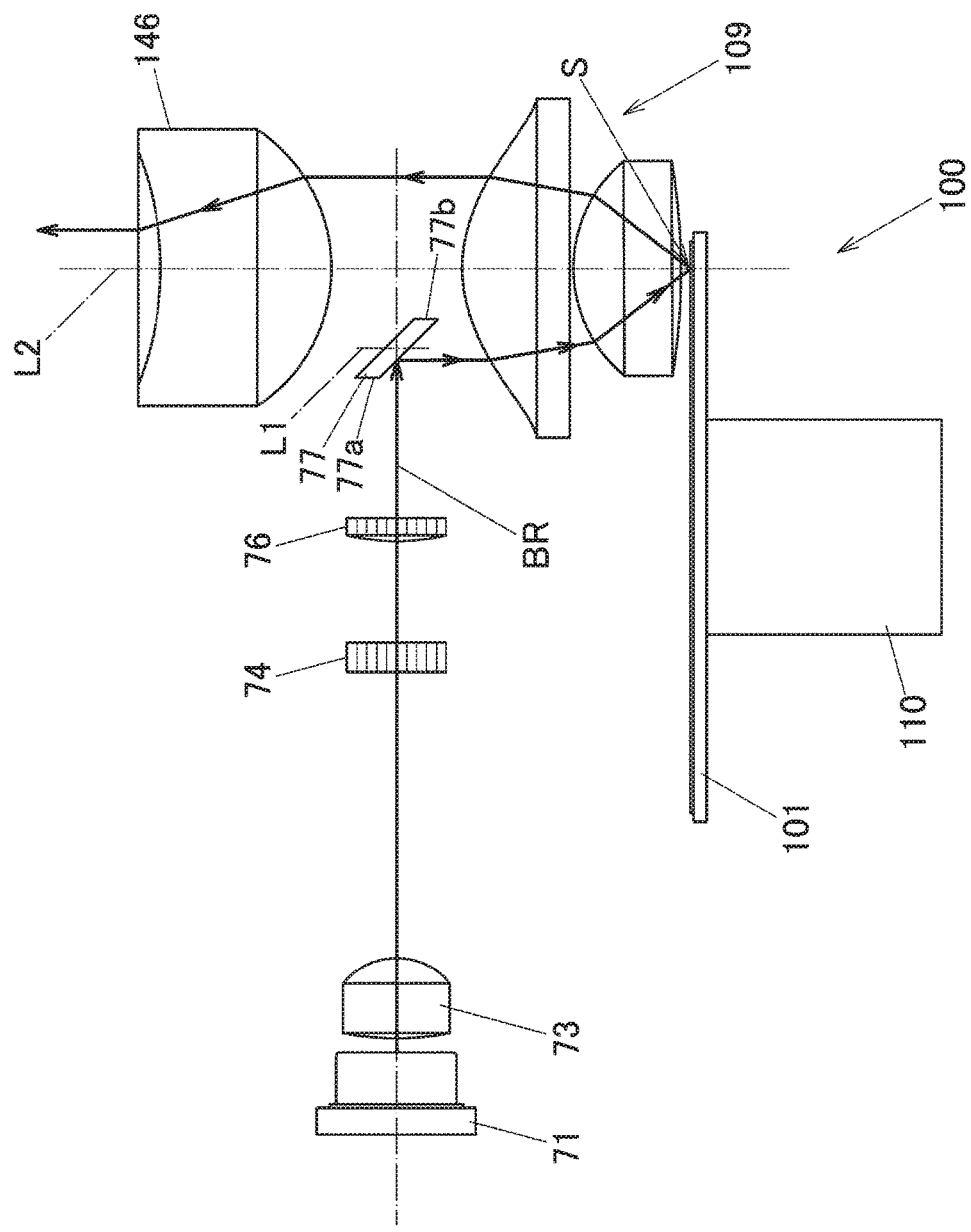
FIG. 5 is an enlarged plan view schematically illustrating an area including a dichroic mirror of the light source device and a fluorescent device according to the first embodiment of the present invention.

As shown in FIG. 5 in detail, the dichroic mirror 77 is disposed such that an optical axis L1 which is the central axis of the dichroic mirror 77 and an optical axis L2 of optical members (i.e. an optical axis extending from the fluorescent wheel 101 to a light tunnel 175) are arranged side by side. Therefore, light BR of the blue wavelength band reflected by the dichroic mirror 77 enters the condensing lens group 109 obliquely (apart from the optical axis). Also, at this time, in the case where the diffuse reflection area 104 of the fluorescent wheel 101 is positioned at an irradiation spot S, the light BR of the blue wavelength band entering the condensing lens group 109 is diffused and reflected by the diffuse reflection area 104 of the fluorescent wheel 101. Further, since the light BR of the blue wavelength band entering from the condensing lens group 109 enters obliquely with respect to the condensing lens group 109, the light BR of the blue wavelength band reflected by the diffuse reflection area 104 which is a reflective mirror is emitted along an optical axis apart from the optical axis L2 of the condensing lens group 109, the light tunnel 175, and so on.

As described above, the optical axis of the light BR of the blue wavelength band emitted from the condensing lens group 109 is deviated from the optical axis L1 of the dichroic mirror 77. Here, the flux density of the light BR of the blue wavelength band is high on the optical axis thereof. Further, the optical axis of the light BR of the blue wavelength band which is emitted from the condensing lens group 109 crosses the optical axis L1 of the dichroic mirror 77. Therefore, of the light BR of the blue wavelength band which is emitted from the condensing lens group 109, a flux of light which is reflected by the dichroic mirror 77 is less as compared to the case where the dichroic mirror 77 is positioned on the optical axis L2 of the condensing lens group 109 and so on.

Also, although FIG. 3 and FIG. 5 do not show plan views, since the dichroic mirror 77 needs only to be disposed such that the optical axis L1 of the dichroic mirror 77 and the optical axis L2 are arranged side by side, it can be disposed near the optical axis L2.

Figure 6:
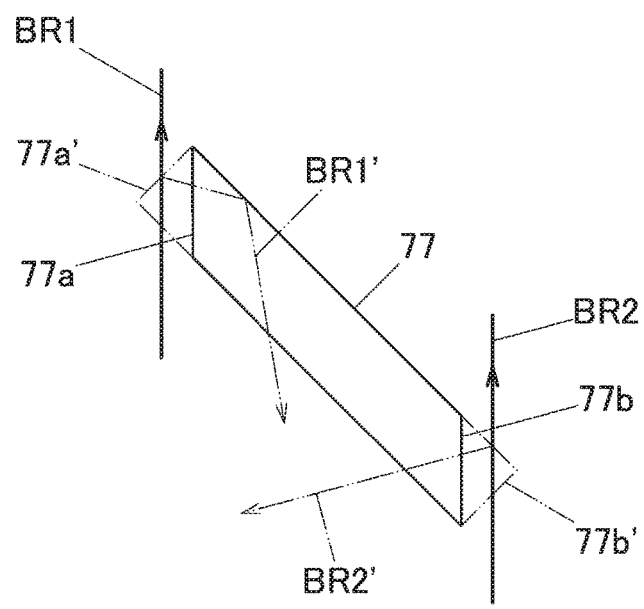
FIG. 6 is an enlarged plan view schematically illustrating the dichroic mirror of the light source device according to the first embodiment of the present invention.

Also, both end parts 77a and 77b of the dichroic mirror 77 which is formed in a plate shape are formed so as to have almost flat surfaces substantially parallel with the optical axis of the condensing lens group 109. Therefore, it is possible to reduce interference between light emitted from the condensing lens group 109 and the dichroic mirror 77. In other words, as shown by an alternate long and two short dashes line of FIG. 6, in the case where the dichroic mirror 77 has two right-angled end parts 77a' and 77b', rays BR1 and BR2 of the light BR of the blue wavelength band passing near both end parts of the dichroic mirror 77 interfere with both end parts 77a' and 77b' and are reflected, thereby becoming rays BR1' and BR2' unusable as source light. However, in the case where the dichroic mirror has both end parts 77a and 77b having almost flat surfaces substantially parallel with the optical axis L2, the rays BR1 and BR2 which passes near both end parts of the dichroic mirror 77 passes without interfering with both ends of the dichroic mirror 77, and are used as source light.

Also, the optical axis of light of the green wavelength band which is fluorescent light which is emitted by the fluorescent area 103 of the fluorescent wheel 101 coincides with the optical axis L2. Since the light of the green wavelength band is fluorescent light, it is diffuse light. Therefore, as described above, interference between the light of the green wavelength band and both end parts 77a and 77b of the dichroic mirror 77 decreases.

Referring to FIG. 3 again, the condensing lens 146 is disposed on the emission side of the fluorescent wheel device 100 of the green light source device 80 so as to reduce the flux of light from the fluorescent wheel device 100 (the light of the blue wavelength band and the light of the green wavelength band). More specifically, the condensing lens 146 which is a reduction optical member has a convex lens 146a on the incidence side and has a concave lens 146b on the emission side.

The composite dichroic mirror 148 is disposed on a side of the condensing lens 146 close to the rear panel 13 at a position where the light of the blue wavelength band emitted from excitation light radiation device 70 and reflected by the diffuse reflection area 104 of the fluorescent wheel 101 and the light of the green wavelength band emitted from the fluorescent area 103 of the fluorescent wheel 101 cross the light of the red wavelength band emitted from the red light source device 120 at right angles.

Figure 7:
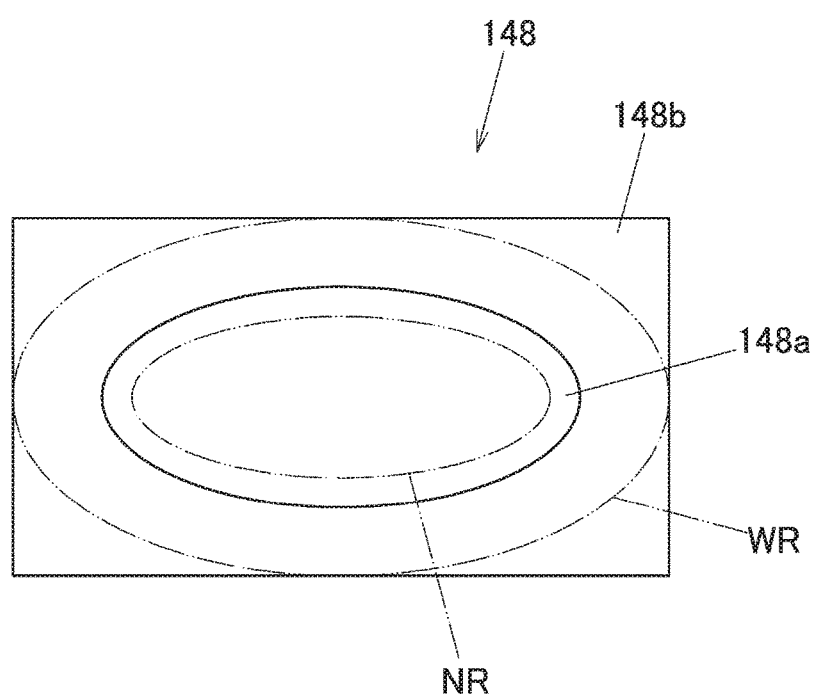
FIG. 7 is a front view schematically illustrating a composite dichroic mirror of the light source device according to the first embodiment of the present invention.

As shown in FIG. 7, the composite dichroic mirror 148 which is formed in a long rectangular plate shape has a first area 148a having a laterally-long elliptic shape, and a second area 148b positioned in an area outside the first area 148a. The composite dichroic mirror 148 is disposed so as to be inclined at about 45° to the optical axis L2 of the light emitted from the light source devices 70, 80, and 120 of the individual colors. To this end, the first area 148a is formed in the laterally-long elliptic shape which is almost a perfect circle shape as seen from the light source side. The center of the first area 148a coincides with an approximate center of the composite dichroic mirror 148. Also, the first area 148a may be formed in a long rectangular shape; however, if the first area 148a is formed in an elliptic shape like the present embodiment, it is possible to make the first area consistent with the light of the wavelength bands of the individual colors having laterally long cross section shapes according to the aspect ratio of the display element 51.

The first area 148a is composed of a dichroic mirror, and transmits light of the blue wavelength band and light of the green wavelength band, and reflects light of the red wavelength band. The second area 148b is composed of a reflective mirror reflecting light of the wavelength bands of the individual colors. In other words, the first area 148a is formed so as to guide light of the red wavelength band in the same direction as a direction in which the second area 148b guides light of the red wavelength band and guide light of the green wavelength band in a direction different from a direction in which the second area 148b guides light of the green wavelength band. Further, as described above, by the condensing lens 146 which is a reduction optical member for reducing a flux of light, the widths of the longitudinal section of each of the light of the blue wavelength band and the light of the green wavelength band in the up-and-down direction and the left-right direction are reduced. The degree of reduction in the flux of light is the degree to which the flux of light is radiated in the range of the first area 148a is irradiated as shown by a reference symbol "NR" of FIG. 7. Meanwhile, light of the red wavelength band which is emitted from the red light source device 120 is radiated in a range of the composite dichroic mirror 148 larger than the range of the first area 148a and smaller than the range of the second area 148b. In other words, the light of the first wavelength band is radiated corresponding to the first area 148a and the second area 148b of the composite dichroic mirror 148, and the light of the second wavelength band is radiated corresponding to the first area 148a of the composite dichroic mirror 148. As described above, by the reduction optical member, the light of the blue and green wavelength bands is narrowed more than the light of the red wavelength band is. Also, the light emission area of the first light source (the red light source device 120) is larger than the light emission area of the second light source (the green light source device 80).

Also, in the present embodiment, the condensing lens 146 is disposed as a reduction optical member; however, it is also possible to adjust the refraction index of the condensing lens group 109 and use the condensing lens group 109 as a reduction optical member, without the condensing lens 146.

If the composite dichroic mirror 148 of the present embodiment is used, the efficiency of the light of the red wavelength band from the red light source device 120 improves. In other words, in the case where the dichroic mirror for reflecting light of the red wavelength band and transmitting light of the green wavelength band is disposed at the position where light of the red wavelength band and light of the blue wavelength band cross each other at a right angle, a part of the light of the red wavelength band overlapping the light of the green wavelength band passes through the dichroic mirror, and the light of the red wavelength band having passed through the dichroic mirror cannot be used as source light. However, according to the composite dichroic mirror 148 of the present embodiment, all of the light of the red wavelength band radiated on the second area 148b is reflected, and of the light of the red wavelength band radiated on the first area 148a, only light of a wavelength band overlapping the light of the green wavelength band is transmitted. Therefore, it is possible to efficiently use the light of the red wavelength band as source light.

Referring to FIG. 3 again, the light source side optical system 170 is configured with condensing lenses 173 and 174, the light tunnel 175, a condensing lens 178, an optical-axis changing mirror 181, a condensing lens 183, an irradiation mirror 185, and a condensing lens 195. Also, since the condensing lens 195 emits image light emitted from the display element 51 disposed on a side of the condensing lens 195 close to the rear panel 13 toward a fixed lens group 225 and the movable lens group 235, it is a part of the projection side optical system 220

The light of the wavelength bands of the individual colors reflected and transmitted by the composite dichroic mirror 148 enters a color wheel 191 of the color wheel device 190 via the condensing lenses 173 and 174, and then enters the light tunnel 175. The flux of light entering the light tunnel 175 is converted into a flux having a uniform intensity distribution by the light tunnel 175.

Figure 4B:
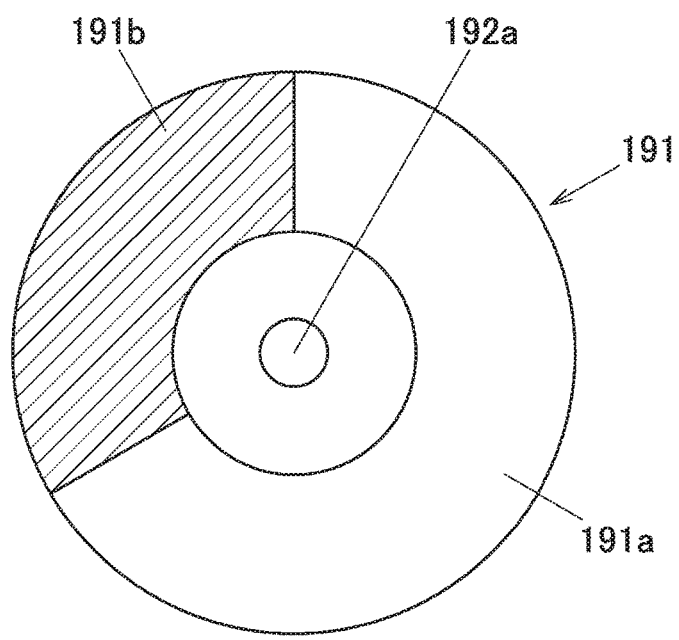
FIG. 4B is a front view schematically illustrating a color wheel of the light source device according to the first embodiment of the present invention.

The color wheel device 190 includes a wheel motor 192 for driving the color wheel 191, and a heat sink 193. As shown in FIG. 4B, the color wheel 191 which is fixed to a drive shaft 192a of the wheel motor 192 has an RB segment area 191a for transmitting only predetermined wavelengths of light of the red wavelength band and light of the blue wavelength band and reflecting light of the other wavelength bands, and a G segment area 191b for transmitting only predetermined wavelengths of light of the green wavelength band and reflecting light of the other wavelength bands. By this color wheel 191, it is possible to improve the color purity of each color.

On a part of the optical axis of the light tunnel 175 close to the rear panel 13, the optical-axis changing mirror 181 is disposed with the condensing lens 178 interposed between the light tunnel and the optical-axis changing mirror. The flux of light emitted from the exit port of the light tunnel 175 is collected by the condensing lens 178, and then the optical axis thereof is changed toward the left panel 15 by the optical-axis changing mirror 181.

The flux of light reflected by the optical-axis changing mirror 181 is collected by the condensing lens 183, and then is reflected by the irradiation mirror 185, thereby entering the display element 51 at a predetermined angle via the condensing lens 195. Also, the display element 51 which is a DMD has a heat sink 53 on a side close to the rear panel 13, and this heat sink 53 cools the display element 51.

A flux of light which is source light radiated on the image formation surface of the display element 51 via the light source side optical system 170 is reflected by the image formation surface of the display element 51 and is projected as projection light onto the screen via the projection side optical system 220. Here, the projection side optical system 220 is configured with the condensing lens 195, the movable lens group 235, and the fixed lens group 225. The fixed lens group 225 is embedded in a fixed lens barrel. The movable lens group 235 is embedded in a movable lens barrel, and can be moved for zoom adjustment and focus adjustment by a lens motor.

Since the projector 10 is configured as described above, if emitting light from the excitation light radiation device 70 and the red light source device 120 at different timings while rotating the fluorescent wheel 101, light of the red, green, and blue wavelength bands enters the condensing lenses 173 and 174, the color wheel device 190, and the light tunnel 175 sequentially via the optical guiding system 140, and enters the display element 51 via the light source side optical system 170. Therefore, the DMD which is the display element 51 of the projector 10 can display light of the individual colors in a time division manner according to data, thereby capable of projecting color images onto the screen.

Figure 8:
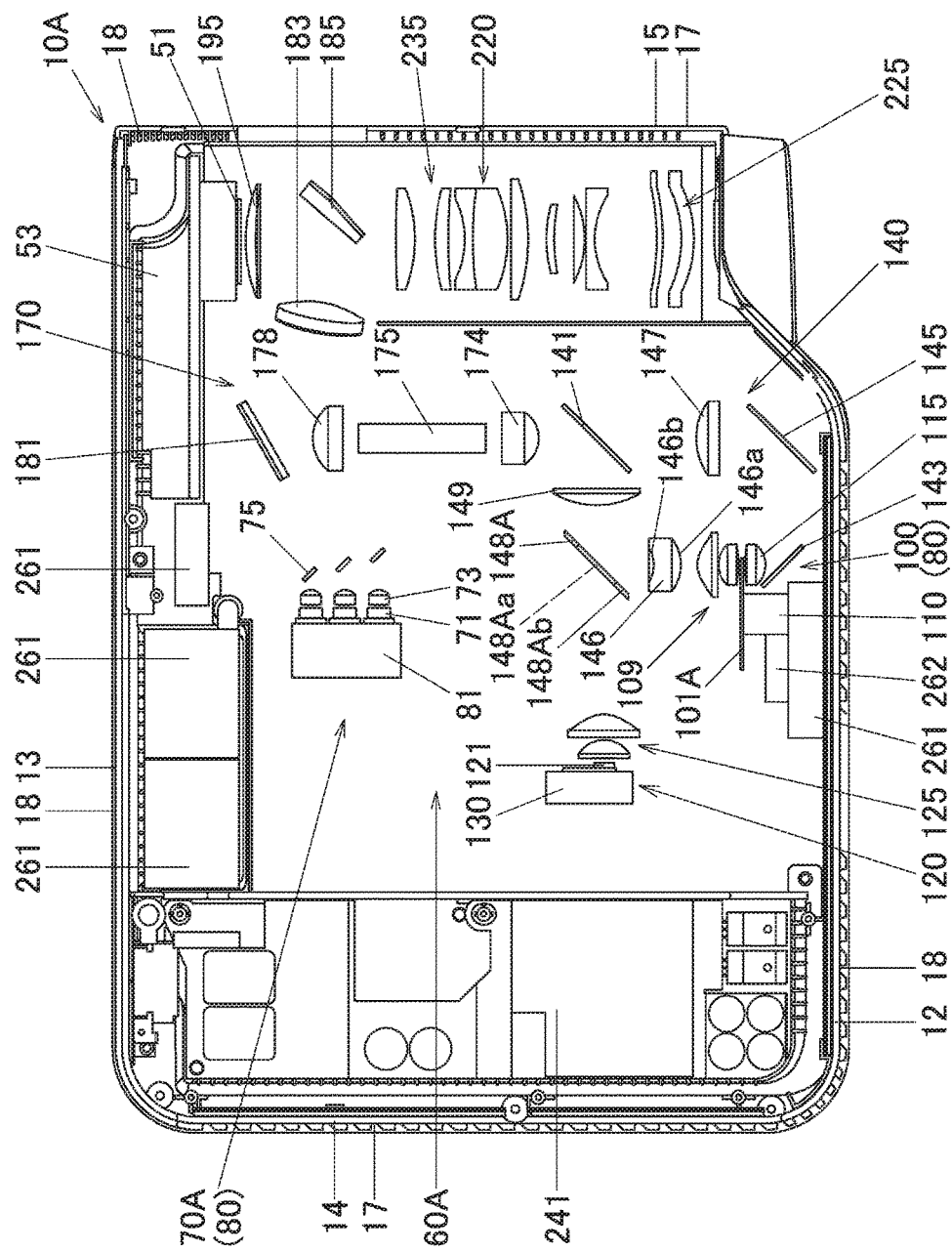
FIG. 8 is a plan view schematically illustrating the inner structure of a projector according to a second embodiment of the present invention.

Now, with reference to FIG. 8, a projector 10A according to a second embodiment of the present invention will be described. The projector 10A has a composite dichroic mirror 148A having a first area 148Aa configured to transmit light of the red wavelength band and light of the blue wavelength band and reflect light of the green wavelength band and a second area 148Ab configured to transmit light of the wavelength bands of the individual colors, instead of the composite dichroic mirror 148 of the projector 10 of the first embodiment. In other words, the first area 148Aa is formed so as to guide light of the red wavelength band in the same direction as a direction in which the second area 148Ab guides light of the red wavelength band and guide light of the green wavelength band in a direction different from a direction in which the second area 148Ab guides light of the green wavelength band. The composite dichroic mirror 148A is formed almost in a long rectangular shape similarly to the composite dichroic mirror 148 of the first embodiment shown in FIG. 7, and at the center thereof, the first area 148Aa is formed in an approximately elliptic shape, and at the outer periphery thereof, the second area 148Ab is formed. In the following description, members and parts identical to those of the first embodiment are denoted by the same reference symbols, and a description thereof will not be made or will be made briefly.

The projector 10A includes a light source device 60A, which includes an excitation light radiation device 70A. The excitation light radiation device 70A has three blue laser diodes 71 and three collimator lenses 73 such that the excitation light radiation device emits light in parallel with the rear panel 13. On the optical axes of light which is emitted from the blue laser diodes 71, reflective mirrors 75 are installed to change the optical axes of light emitted from the blue laser diodes 71 by 90°, i.e. to reflect the light toward the front panel 12.

The red light source device 120 is disposed at a position where light emitted from the red light source device 120 intersects with light of the blue wavelength band reflected by the reflective mirrors 75 of the excitation light radiation device 70. At the position where light of the red wavelength band which is light emitted from the red light source device 120 intersects with light of the blue wavelength band reflected by the reflective mirrors 75 of the excitation light radiation device 70, the composite dichroic mirror 148A is installed. Both end parts of the composite dichroic mirror 148A are formed so as to have almost flat surfaces substantially parallel with the optical axis of the condensing lens group 125 of the red light source device 120. Therefore, similarly to the dichroic mirror 77 of the first embodiment, interference between both end parts of the composite dichroic mirror 148A and light of the red wavelength band which is light emitted from the red light source 121 decreases.

Also, a fluorescent wheel 101A has a fluorescent area similar to the fluorescent area 103 of the fluorescent wheel 101 of the first embodiment shown in FIG. 4A. Meanwhile, the fluorescent wheel 101A of the present embodiment has a diffuse transmission area configured to transmit while diffusing light of the blue wavelength band, instead of the diffuse reflection area 104 of the first embodiment shown in FIG. 4A.

On the rear surface side of the fluorescent wheel 101A (in other words, the side close to the front panel 12), the condensing lens 115 is installed. On a side of the condensing lens 115 close to the front panel 12, a reflective mirror 143 is installed so as to change the optical axis of light emitted from the condensing lens 115 toward the left panel 15 by 90°. On a side of the reflective mirror 143 close to the left panel 15, a reflective mirror 145 is installed so as to change the optical axis of light reflected by the reflective mirror 143 toward the rear panel 13 by 90°. On a side of the reflective mirror 145 close to the rear panel 13, a condensing lens 147 is installed.

Also, on a side of the composite dichroic mirror 148A close to the left panel 15, a condensing lens 149 is installed. Further, at a position where light emitted from the condensing lens 147 intersects with light emitted from the condensing lens 149, a dichroic mirror 141 is installed. The dichroic mirror 141 reflects light of the red wavelength band and light of the green wavelength band and transmits light of the blue wavelength band. The optical guiding system 140 of the present embodiment includes the dichroic mirror 141, the reflective mirrors 143 and 145, the condensing lenses 146, 147, and 149, and the composite dichroic mirror 148A.

Light emitted from the excitation light radiation device 70A is radiated onto the fluorescent area of the fluorescent wheel 101A via the composite dichroic mirror 148A, the condensing lens 146, and the condensing lens group 109. Further, in the case where the fluorescent area of the fluorescent wheel 101A is positioned at an irradiation spot corresponding to the condensing lens group 109, light of the blue wavelength band from the excitation light radiation device 70A enters the light tunnel 175 via the condensing lens 115, the reflective mirror 143, the reflective mirror 145, the condensing lens 147, the dichroic mirror 141, and the condensing lens 174.

In the case where the fluorescent area of the fluorescent wheel 101A is positioned at the irradiation spot corresponding to the condensing lens group 109 of the fluorescent wheel device 100, the fluorescent area is excited by the light emitted as excitation light from the excitation light radiation device 70A and emits fluorescent light of the green wavelength band. The light of the green wavelength band emitted from the fluorescent wheel 101A enters the condensing lens 146 via the condensing lens group 109. Similarly to the first embodiment, the condensing lens 146 reduces the light of the green wavelength band and emits the light toward the first area 148Aa of the composite dichroic mirror 148A.

Also, light of the red wavelength band emitted from the red light source device 120 is radiated onto the first area 148Aa and the second area 148Ab of the composite dichroic mirror 148A. Therefore, all of the light of the red wavelength band radiated on the second area 148Ab is transmitted, and only light which is a part of the light of the red wavelength band radiated on the first area 148Aa and is in a wavelength band overlapping the green wavelength band is reflected.

Also, even in the present embodiment, similarly to the first embodiment, between the condensing lens group 109 of the fluorescent wheel device 100 and the condensing lens 146, the dichroic mirror 77 of the first embodiment can be disposed so as to radiate the light emitted from the excitation light radiation device 70A onto the fluorescent wheel 101A. In this case, similarly to the first embodiment, the optical axis of the dichroic mirror 77 and the optical axis of the optical members such as the condensing lens group 109, the condensing lens 146, and so on can be disposed side by side.

Figure 9:
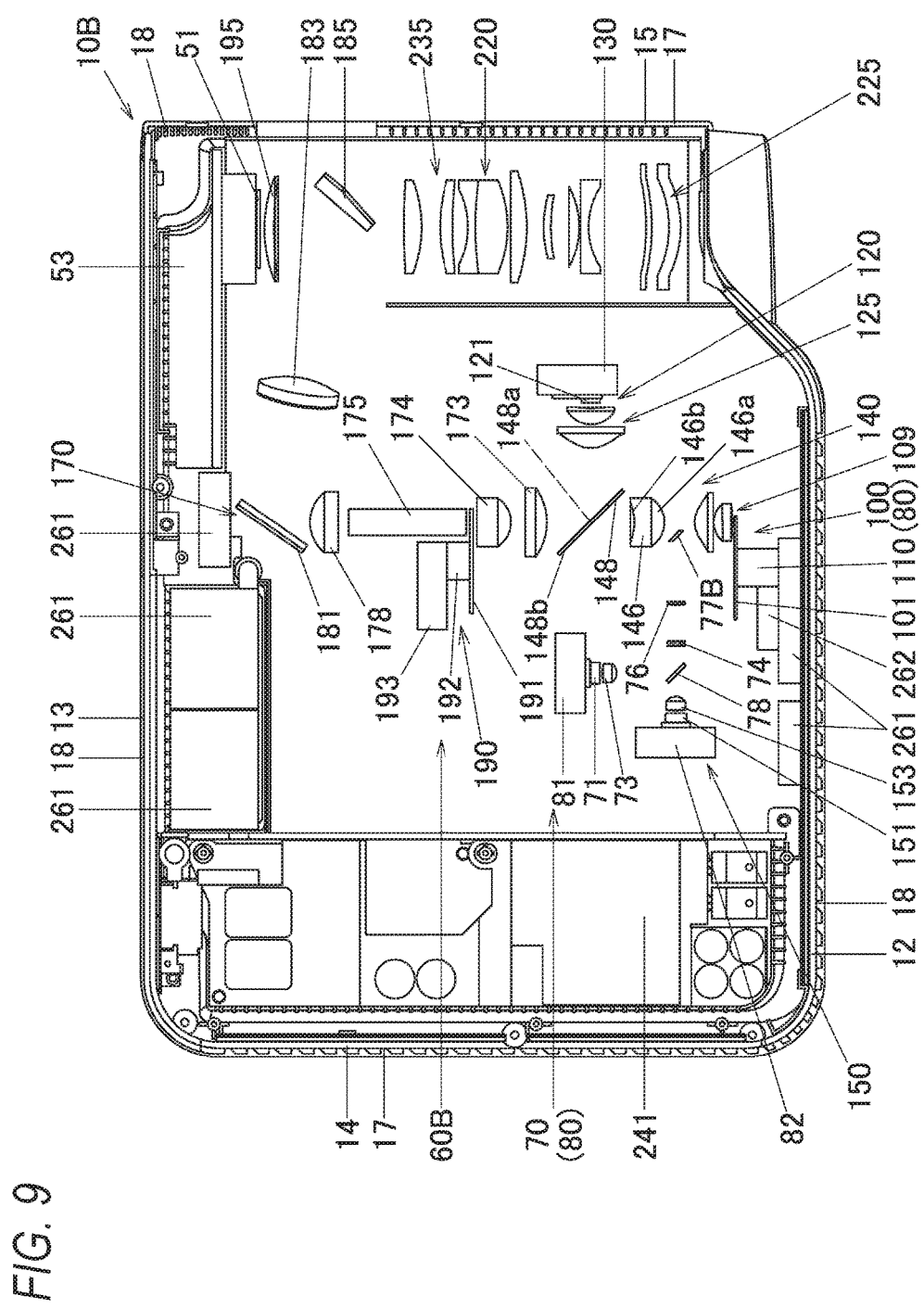
FIG. 9 is a plan view schematically illustrating the inner structure of a projector according to a third embodiment of the present invention.

Now, with reference to FIG. 9, a light source 60B in a third embodiment of the present invention will be described. In a projector 10B according to the third embodiment, at the position of the excitation light radiation device 70 of the projector 10 of the first embodiment (see FIG. 3), an auxiliary light source device 150 is disposed. In the following description, members and parts identical to those of the first embodiment are denoted by the same reference symbols, and a description thereof will not be made or will be made briefly.

The auxiliary light source device 150 includes a red laser diode 151, and a collimator lens 153 disposed on the optical axis of light which is emitted from the red laser diode 151. Therefore, since the projector 10B has the auxiliary light source device 150 having the red laser diode 151, in addition to the red light source device 120 having the red light source 121 which is a red light emitting diode, it is possible to obtain bright red source light. On the rear surface of the red laser diode 151, a heat sink 82 for cooling the red laser diode 151 is installed.

The excitation light radiation device 70 of the present embodiment is disposed such that light emitted from the excitation light radiation device crosses light emitted from the auxiliary light source device 150 at a right angle. Further, at the position where light emitted from the excitation light radiation device 70 crosses light emitted from the auxiliary light source device 150 at a right angle, a dichroic mirror 78 is disposed. The dichroic mirror 78 reflects light of the blue wavelength band and transmits light of the red wavelength band.

Also, in the present embodiment, instead of the dichroic mirror 77 of the first embodiment, a dichroic mirror 77B configured to reflect light of the red wavelength band and light of the blue wavelength band and transmit light of the green wavelength band is installed. Similarly to the first embodiment, the dichroic mirror 77B is disposed such that the optical axis of the dichroic mirror 77B and the optical axis of the optical members such as the condensing lens group 109 of the fluorescent wheel device 100, the condensing lens 146, and so on are arranged side by side.

The dichroic mirror 78 changes the optical axis of light of the blue wavelength band emitted from the excitation light radiation device 70 toward the left panel 15 by 90°. Similarly to the first embodiment shown in FIG. 5, the light of the blue wavelength band reflected by the dichroic mirror 78 is reflected by the diffuse reflection area 104 of the fluorescent wheel 101 positioned at the irradiation spot S corresponding to the condensing lens group 109, and is emitted from the condensing lens group 109. Similarly, light of the red wavelength band emitted from the auxiliary light source device 150 passes through the dichroic mirror 78, and is reflected by the diffuse reflection area 104 of the fluorescent wheel 101, and is emitted from the condensing lens group 109.

Since the dichroic mirror 77B is apart from the center of the optical axis connecting the reflective area and fluorescent area of the fluorescent wheel 101, the condensing lens group 109, and the light tunnel 175, as compared to the case where the dichroic mirror 77B is disposed on the optical axis of the reflective area and fluorescent area of the fluorescent wheel 101, the condensing lens group 109, and the light tunnel 175, light of the blue wavelength band and light of the red wavelength band which are reflected by the dichroic mirror 77B and become unusable decrease. Light of the red wavelength band emitted from the red laser diode 151 passes through the first area 148a positioned on the center side of the composite dichroic mirror 148. In contrast with this, light of the red wavelength band emitted from the red light source 121 which is a red light emitting diode is radiated onto the entire area of the composite dichroic mirror 148, and light of the red wavelength band radiated on the second area 148b positioned at the outer area is reflected; and light of the red wavelength band radiated on the first area 148a positioned on the center side is transmitted. However, since the area of the second area 148b is larger than the area of the first area 148a, most of the light is reflected. Therefore, light of the red wavelength band which is lost is little. Also, the second area 148b has a configuration reflecting light of the red wavelength band and light of the blue wavelength band. However, the second area 148b may have a configuration transmitting light of the blue wavelength band and light of the green wavelength band.

According to the first to third embodiments of the present invention described above, each of the light source devices 60, 60A, and 60B includes the red light source device 120 (the first light source) configured to emit light of the red wavelength band (light of the first wavelength band), the green light source device 80 (the second light source) configured to emit light of the green wavelength band (light of the second wavelength band) adjacent to light of the red wavelength band, and one of the composite dichroic mirror 148 having the first area 148a and the second area 148b having different characters and the composite dichroic mirror 148A having the first area 148Aa and the second area 148Ab having different characters. Further, the composite dichroic mirrors 148 and 148A reflect light of the red wavelength band while transmitting or reflecting light of the green wavelength band, and light of the red wavelength band is radiated corresponding to the first areas 148a and 148A and the second areas 148b and 148Ab, and light of the green wavelength band is radiated corresponding to the first areas 148a and 148A.

Therefore, light which is a part of the light of the red wavelength band overlapping the light of the red wavelength band and is in a wavelength band is reflected or transmitted by each dichroic mirror. Therefore, it is possible to suppress light unusable as source light from occurring. Therefore, it is possible to improve the use efficiency of light of the red wavelength band emitted from the red light source device 120.

Also, each of the composite dichroic mirrors 148 and 148A is disposed at the position where light of the red wavelength band and light of the green wavelength band cross each other. Further, the first areas 148a and 148A and the second areas 148b and 148Ab guide light of the red wavelength band in the same direction, and guide light of the green wavelength band in different directions. Therefore, it is possible to more surely use light which is a part of the light of the red wavelength band overlapping the light of the green wavelength band as source light.

Also, the light emission area of the red light source device 120 is larger than the light emission area of the green light source device 80. Therefore, it is possible to widely radiate light of the red wavelength band onto the entire composite dichroic mirror 148 or 148A and radiate light of the green wavelength band onto only the first area 148a or 148Aa.

Also, light of the green wavelength band is radiated onto the first area 148a or 148Aa via the condensing lens 146 which is a reduction optical member configured to reduce a flux of light. Therefore, since the light of the green wavelength band is reduced by the condensing lens 146, it is possible to radiate the light of the green wavelength band in the range of the first area 148a or 148Aa.

Also, the second areas 148b and 148Ab are formed around the first areas 148a and 148A, and the second areas 148b and 148Ab are formed in the long rectangular shapes, and the first areas 148a and 148A are formed in the elliptic shapes which have the same centers as those of the second areas 148b and 148Ab and whose major axes coincide with the longitudinal directions of the second areas 148b and 148Ab. Therefore, it is possible to properly radiate light of the red wavelength band and light of the green wavelength band having substantially elliptic section shapes onto the first area 148a and the second area 148b.

Also, the first area 148a of the composite dichroic mirror 148 is formed so as to reflect light of the red wavelength band while transmitting light of the green wavelength band, and the second area 148b is formed so as to reflect light of the red wavelength band. Also, the first area 148Aa of the composite dichroic mirror 148A is formed so as to transmit light of the red wavelength band while reflecting light of the green wavelength band, and the second area 148Ab is formed so as to transmit light of the red wavelength band. Therefore, according to the layouts of the light source devices 60, 60A, and 60B, it is possible to transmit light of the red wavelength band and light of the green wavelength band along the same light path.

Also, the end parts of the composite dichroic mirror 148A are formed so as to have flat surfaces parallel with light of the red wavelength band. Therefore, interference between light of the red wavelength band passing through the composite dichroic mirror 148A and both end parts of the composite dichroic mirror 148A decreases.

Also, each of the light source devices 60, 60A, and 60B has the excitation light radiation device 70 or 70A (the third light source) configured to emit light of the blue wavelength band (light of the third wavelength band), and is an excitation light source for emitting light of the green wavelength band which is fluorescent light. Therefore, it is possible to use high-luminance fluorescent light as source light.

Also, the fluorescent wheel 101 of the fluorescent wheel device 100 of the green light source device 80 has a transmissive area which transmits light of the blue wavelength band emitted from the excitation light radiation device 70 or 70A or a reflective area (the diffuse reflection area 104) which reflects light of the blue wavelength band. Therefore, it is possible to use light of the green wavelength band emitted from the excitation light radiation device 70 or 70A as source light and guide light of the blue wavelength band along the same light path as that for light of the red wavelength band and light of the green wavelength band.

Also, the red light source device 120 has the red light source 121 which is a red light emitting diode, and the excitation light radiation devices 70 and 70A have the blue laser diodes 71. Therefore, it is possible to use a light emitting diode or a laser diode which is a semiconductor light emitting device having high luminance and low power consumption as a light source. Also, the green light source device 80 for emitting light of the green wavelength band has the fluorescent wheel device 100. Therefore, it is possible to obtain the light source devices 60, 60A, and 60B each of which has three light sources and has improved luminous efficiency.

Also, each of the projectors 10, 10A, and 10B has one of the light source devices 60, 60A, and 60B each of which has the composite dichroic mirror 148 or 148A, the display element 51 which is irradiated with source light from the light source device 60, 60A, or 60B and forms image light, the projection side optical system 220 which projects the image light emitted from the display element 51 onto the screen, and the projector control unit which controls the display element 51 and the light source device 60, 60A, or 60B. Therefore, it is possible to obtain the projectors 10, 10A, and 10B each of which has the light source devices 60, 60A, or 60B having improved luminous efficiency.

Also, the above-described embodiments have been presented by way of example only, and are not intended to limit the scope of the inventions. The above-described novel embodiments may be embodied in a variety of other forms; furthermore, various omissions, substitutions and changes in the above-described embodiments may be made without departing from the spirit of the inventions. The above-described embodiments and modifications thereof are included in the scope and gist of the inventions, and are included in the scope of inventions disclosed in claims and equivalents of them.

What is claimed is:

1. A light source device comprising:
a first light source that is configured to emit light of a first wavelength band;
a second light source that is configured to emit light of a second wavelength band which is different from the first wavelength band; and
a composite dichroic mirror that has a first area and a second area having characteristics different from characteristics of the first area,
wherein:
the composite dichroic mirror reflects the light of the first wavelength band while transmitting the light of the second wavelength band,
the light of the first wavelength band is radiated corresponding to the first area and the second area of the composite dichroic mirror,
the light of the second wavelength band is radiated corresponding to the first area of the composite dichroic mirror,
the composite dichroic mirror is disposed at a position where the light of the first wavelength band and the light of the second wavelength band cross each other,
the first area is formed so as to guide the light of the first wavelength band in a same direction as a direction in which the second area guides the light of the first wavelength band, and
the first area is formed so as to guide the light of the second wavelength band in a direction different from a direction in which the second area guides the light of the second wavelength band.

2. The light source device according to claim 1, wherein:
a light emission area of the first light source is larger than a light emission area of the second light source.

3. The light source device according to claim 1, wherein:
a light emission area of the first light source is larger than a light emission area of the second light source.

4. The light source device according to claim 1, wherein:
the light of the second wavelength band is radiated onto the first area via a reduction optical member which is configured to reduce a flux of light.

5. The light source device according to claim 1, wherein:
the second area is formed around the first area, and
the second area is formed in a long rectangular shape, and the first area is formed in an elliptic shape which has a same center as a center of the second area and whose major axis coincides with a longitudinal direction of the second area.

6. The light source device according to claim 1, wherein:
the first area is formed so as to reflect the light of the first wavelength band while transmitting the light of the second wavelength band, and
the second area is formed so as to reflect the light of the first wavelength band.

7. The light source device according to claim 1, wherein:
end parts of the composite dichroic mirror are formed so as to have flat surfaces parallel with the light of the first wavelength band.

8. The light source device according to claim 1, further comprising:
a third light source that is configured to emit light of a third wavelength band which is different from both of the light of the first wavelength band and the light of the second wavelength band,
wherein the second light source includes a fluorescent wheel device having a fluorescent area which is excited by the light of the third wavelength band as excitation light and which emits fluorescent light.

9. The light source device according to claim 8, wherein:
the fluorescent wheel device has a transmissive area which transmits the light emitted from the third light source.

10. The light source device according to claim 8, wherein:
the fluorescent wheel device has a reflective area which reflects the light emitted from the third light source.

11. The light source device according to claim 8, wherein:
the first light source is a light emitting diode, and
the third light source is a laser diode.

12. The light source device according to claim 8, wherein:
the light of the first wavelength band is light of a red wavelength band in the case where the first light source is a red light emitting diode,
the light of the second wavelength band is light of a green wavelength band in the case where the second light source is the fluorescent wheel device, and
the light of the third wavelength band is light of a blue wavelength band in the case where the third light source is a blue laser diode.

13. A projector comprising:
the light source device according to claim 1,
a display element that is configured to be irradiated with source light from the light source device and that is configured to form image light,
a projection side optical system that is configured to project the image light emitted from the display element onto a screen, and
a projector control unit that is configured to control the display element and the light source device.

14. A light source device comprising:
a first light source that is configured to emit light of a first wavelength band;
a second light source that is configured to emit light of a second wavelength band which is adjacent to the first wavelength band;
a composite dichroic mirror that has a first area and a second area having characteristics different from characteristics of the first area,
wherein:
the composite dichroic mirror transmits the light of the first wavelength band while reflecting the light of the second wavelength band,
the light of the first wavelength band is radiated corresponding to the first area and the second area of the composite dichroic mirror, the light of the second wavelength band is radiated corresponding to the first area of the composite dichroic mirror, the composite dichroic mirror is disposed at a position where the light of the first wavelength band and the light of the second wavelength band cross each other, the first area is formed so as to guide the light of the first wavelength band in a same direction as a direction in which the second area guides the light of the first wavelength band, and the first area is formed so as to guide the light of the second wavelength band in a direction different from a direction in which the second area guides the light of the second wavelength band.

15. The light source device according to claim 14, wherein:

a light emission area of the first light source is larger than a light emission area of the second light source.

16. The light source device according to claim 14, wherein:

a light emission area of the first light source is larger than a light emission area of the second light source.

17. The light source device according to claim 14, wherein:

the first area is formed so as to transmit the light of the first wavelength band while reflecting the light of the second wavelength band, and the second area is formed so as to transmit the light of the first wavelength band.

18. A projector comprising:

the light source device according to claim 14, a display element that is configured to be irradiated with source light from the light source device and that is configured to form image light, a projection side optical system that is configured to project the image light emitted from the display element onto a screen, and a projector control unit that is configured to control the display element and the light source device.

* * * * *